United States Patent [19]

Yamaguchi

[11] Patent Number: 6,166,839
[45] Date of Patent: Dec. 26, 2000

[54] OPTICAL TRANSMITTING APPARATUS, OPTICAL RECEIVING APPARATUS, AND OPTICAL TRANSMITTING-RECEIVING SYSTEM

[75] Inventor: Takashi Yamaguchi, Minato-ku, Japan

[73] Assignee: Oki Electric Industry Co., Ltd., Tokyo, Japan

[21] Appl. No.: 08/946,253

[22] Filed: Oct. 7, 1997

[30] Foreign Application Priority Data

Apr. 21, 1997 [JP] Japan ................................ 9-103042

[51] Int. Cl.[7] .......................... H04B 10/00; H04B 10/12; H04B 15/00
[52] U.S. Cl. .......................... 359/161; 359/155; 359/158; 359/154
[58] Field of Search .................... 359/158, 161, 359/180, 189, 181

[56] References Cited

U.S. PATENT DOCUMENTS

| | | | |
|---|---|---|---|
| 4,267,590 | 5/1981 | Bosotti | 370/3 |
| 4,742,575 | 5/1988 | Arita | 455/608 |
| 5,444,561 | 8/1995 | Kaminishi | 359/158 |
| 5,589,683 | 12/1996 | Nakai | 250/214 R |
| 5,652,767 | 7/1997 | Kiyonaga et al. | 375/317 |
| 5,923,455 | 7/1999 | Rokugawa | 359/189 |

OTHER PUBLICATIONS

A. Takai et al., "(The Current Condition of) Optical Interconnects", Shingakugiho, LOE96–150, Feb. 1997, pp. 43–48.

*Primary Examiner*—Leslie Pascal
*Assistant Examiner*—Agustin Bello
*Attorney, Agent, or Firm*—Wenderoth, Lind & Ponack, L.L.P.

[57] ABSTRACT

An optical transmitting apparatus has an identification level output circuit which outputs identification level information which is required when a logical level of transmission data is determined by a received signal, which has been converted from an optical signal to an electrical signal by an opposing optical receiving apparatus. The optical transmitting apparatus also has a light emitter for the identification level information which performs an electrical-to-optical conversion of the identification level information from the identification level output circuit and irradiates the identification level information toward a light transmitting path for exclusive use with the identification level information. Also, there is an optical receiving apparatus which has a light sensor for the identification level information which performs an optical-to-electrical conversion of an optical signal arrived via a light transmitting path for exclusive use with identification level information for logical level identification of the data the data having been transmitted in the same way by the optical transmitting apparatus. The optical receiving apparatus also has an identification level supplying circuit which outputs an identification level determined by an electric signal from the light sensor for the identification level information.

12 Claims, 8 Drawing Sheets

OPTICAL TRANSMITTING APPARATUS, OPTICAL RECEIVING APPARATUS, AND OPTICAL TRANSMITTING-RECEIVING SYSTEM

BACKGROUND OF THE INVENTION

1. Field of the Invention

The present invention relates to an optical transmitting apparatus, an optical receiving apparatus, and an optical transmitting-receiving system. For example, the present invention is applicable to a device or a system for optical interconnection, in which data are sent and received between a plurality of boards and devices by the parallel synchronous transmission of optical signals.

2. Description of the Related Art

In a parallel computer or an electronic data interchanging system, an optical interconnecting method in which data are sent and received by the parallel synchronous transmission of optical signals is applied to the transmissions between a plurality of boards or devices (cabinets). The application is examined and studied as described in A. Takai et al. "(The Current Condition of) Optical Interconnects" (Shingakugiho, LQE96-150, February 1997).

According to the optical interconnecting method, in general, at a transmitter side, each of a plurality of transmission data in a synchronous state makes an electrical-to-optical conversion by a laser diode corresponding to each of the transmission data, and the data is sent to an optical fiber corresponding to each of the transmission data among a plurality of optical fibers mounted in tape shapes or coaxial shapes. At a receiver side, each of the transmission data (optical signals) transmitted via the optical fiber makes an optical-to-electrical conversion by corresponding photodiodes, and thereafter, the size of each transmission data converted into an electric signal is compared to a fixed identification level. A code (logical level) of each transmission data is thereby determined.

Also, in a case in which the code (logical level) of each received data is determined at the receiver side by using the fixed identification level, the higher logical levels in the received data are dispersed due to temperature characteristics of active elements such as laser diodes and photodiodes and due to the dispersion of optical power transmitted via the optical fiber. With the aforementioned in view, the fixed identification level must be lowered. Accordingly, voltages of lower logical levels in the received data, which are to be sufficiently smaller than the fixed identification level, must be set as small as possible. Thus, conventionally, a direct current bias is not applied to the laser diode (e.g., 0 mA). As a result, a pattern effect that is characteristic to the digital modulation of the laser diode becomes apparent. Namely, in a case in which the transmission data having a higher logical level is supplied to the laser diode and oscillates again, the rise time of oscillation of the laser diode changes depending on the patterns of the logical levels of the past transmission data. More concretely, in the patterns of the logical levels of the past transmission data, in a case in which there are many higher logical levels, the rise of oscillation of the laser diode occurs quickly, and in a case in which there are few higher logical levels, the rise of oscillation of the laser diode occurs rather slowly.

In a plurality of transmission data which is subjected to synchronous transmission, the changing patterns of the logical levels are often different from each other. As a result, due to the difference of the rise times of oscillation among each of a plurality of laser diodes that executes an electrical-to-optical conversion of each of the data, a skew in which phases of each of the regenerated data are not uniform occurs when regenerating the data at the receiver side.

Figure 2:
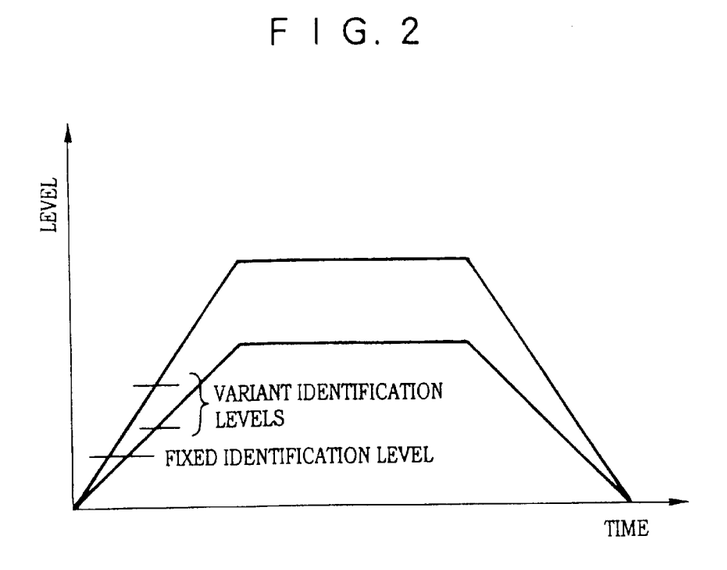
FIG. 2 is an explanation auxiliary view of conventional drawbacks.

Further, in the method in which the code (logical level) of each received data is determined at the receiver side by using the fixed identification level, as shown in FIG. 2, the skew is changed due to the levels of the plurality of received data, which have made an optical-to-electrical conversion (the larger the difference in the levels, the larger the skew to some extent). In a case in which the levels of received data are changed by temperature or the like, the skew may also be changed.

A drawback was described above in consideration of the synchronous parallel transmission of optical signals. Even when a series of transmission data is optically transmitted in accordance with the conventional method in which the fixed identification level is used for determining the code, there are drawbacks due to the pattern effect and due to the variation in the received levels.

For example, in a case in which a series of transmission data is optically transmitted, a clock signal for regeneration is formed from the regenerated data by using a PLL circuit or the like. When there is a time-axis variation (jittering) due to the pattern effect and due to the variation in the received levels, it is greatly possible that a good regeneration clock is not created.

Accordingly, an optical transmitting apparatus, an optical receiving apparatus, and an optical transmitting-receiving system, in which the time-axis variation in regenerated data can be minimized, are desired. Further, if a plurality of transmission data is synchronously transmitted, an optical transmitting apparatus, an optical receiving apparatus, and an optical transmitting-receiving system, in which the phases of each received data are arranged as uniform as possible, are desired.

SUMMARY OF THE INVENTION

A first aspect of the present invention is an optical transmitting apparatus, comprising: a plurality of light emitters for data, each of which performs an electrical-to-optical conversion of transmission data each formed by one or more signals and irradiates toward a corresponding light transmitting path; identification level output means which outputs identification level information which is required when the logical level of each transmission data is determined by a received signal, which has made an optical-to-electrical conversion by an opposing optical receiving apparatus; and a light emitter for identification level which performs an electrical-to-optical conversion of the identification level information from said identification level output means and irradiates toward a light transmitting path for exclusive use with the identification level information.

A second aspect of the present invention is an optical receiving apparatus, comprising: a plurality of light emitters for data, each of which performs an optical-to-electrical conversion of each data which has been transmitted from an opposing optical transmitting apparatus via a light transmitting path; a light sensing means for identification level which performs an optical-to-electrical conversion of an optical signal supplied via a light transmitting path for exclusive use with identification level information for logical level identification of the data, the data having been transmitted in the same way by the optical transmitting apparatus; identification level supplying means which outputs an identification level determined by an electric signal from said light sensing means for identification level; and a code identification regenerating circuit which receives the identification level information outputted from said identification level supplying means and compares the identification level with the logical level of a received data, which has made an optical-to-electrical conversion and obtained by each of said plurality of light sensing means, so as to determine the logical level of the received data.

Further, a third aspect of the present invention is an optical transmitting-receiving system which includes an optical transmitting apparatus, in which a plurality of light emitters for data corresponding to the respective bits of transmission data performs electrical-to-optical conversions of the transmission data and irradiates toward a plurality of light transmitting paths connected in such a way as to correspond to each of the light emitters. The optical transmitting-receiving system also including an optical receiving apparatus, which opposes the optical transmitting apparatus and in which a plurality of light sensing means for data perform optical-to-electrical conversions and receive the transmission data which have been transmitted via the plurality of light transmitting paths. The optical transmitting apparatus comprises: identification level output means which outputs identification level information which is required when the logical level of each transmission data received at said optical receiving apparatus is determined; and a light emitter for the identification level information which performs an electrical-to-optical conversion of the identification level information from the identification level output means and irradiates it towards a light transmitting path for exclusive use with the identification level information. The optical receiving apparatus comprises: a light sensing means for the identification level which performs an optical-to-electrical conversion of an optical signal received via a light transmitting path for exclusive use with the identification level information; identification level supplying means which outputs an identification level determined by an electric signal from the light sensing means for identification level; and a code identification regenerating circuit which receives the identification level information outputted from the identification level supplying means and compares the identification level with the logical level of a received data, which has gone through an optical-to-electrical conversion and was obtained by each of the plurality of light sensing means for data, so as to determine the logical level of the received data.

In accordance with these aspects of the present invention, since the identification level at the receiver side includes variations due to the temperature or the like which are similar to those of transmitted data, the transmitted data can be properly regenerated from the phase or the like.

Further, a fourth aspect of the present invention is an optical transmitting apparatus in which a light emitter performs an electrical-to-optical conversion of transmission data and irradiates it toward a light transmitting path. The optical transmitting apparatus comprising: logical level adjusting means which adjusts a logical level such that the logical level whose rate of appearance is high in the transmission data is set to the side in which the intensity of light in an optical signal from the light emitter is large, and the logical level adjusting means providing the logical level to the light emitter. Moreover, a fifth aspect of the present invention is an optical receiving apparatus in which, as a code identification regenerating circuit compares an identification level with a received signal which has made an optical-to-electrical conversion and obtained by a light sensing means, the logical level of data, which as been transmitted from an opposing optical transmitting apparatus, is determined and regenerated. The optical receiving apparatus comprising logical level returning means which effects reverse processing onto a processing in the logical level adjusting means of the opposing optical transmitting apparatus.

Furthermore, a sixth aspect of the present invention is an optical transmitting-receiving system which includes an optical transmitting apparatus, in which a light emitter performs an electrical-to-optical conversion of a transmission data and irradiates it towards a light transmitting path. The optical transmitting-receiving system including an optical receiving apparatus which opposes the optical transmitting apparatus and in which the transmission data, which has been transmitted via the light transmitting path, makes an optical-to-electrical conversion and is received by a light sensing means. The optical transmitting apparatus comprises: logical level adjusting means which adjusts a logical level such that the logical level whose rate of appearance is high in the transmission data is set to the side in which the intensity of light in an optical signal from the light emitter is large, and the logical level adjusting means providing the logical level to the light emitter. The optical receiving apparatus comprises: logical level returning means which effects reverse processing onto a processing in the logical level adjusting means of the opposing optical transmitting apparatus.

Due to the transmission of data in accordance with the aforementioned fourth to fifth aspects, the rate in which the light emitter of the optical transmitting apparatus emits light at strong intensity is increased, the average response in the light emission of the light emitter improves, and an unfavorable effect on the phase or the like due to the delay in response to the light emitter can be reduced.

Still further, a seventh aspect of the present invention is an optical transmitting apparatus in which a light emitter performs an electrical-to-optical conversion of a transmission data and irradiates toward a light transmitting path, comprising: bias means which applies a bias current to the transmission data so that, even if a logical level is low in the transmission data, the logical level is set larger than the lowest level in which the light emitter emits light within the range of operating temperature of the optical transmitting apparatus. In this way, even if the logical level of the transmission data is low, since the light emitter invariably rises, an unfavorable effect on the phase surface or the like due to the delay in response to the light emitter can be reduced.

DESCRIPTION OF THE PREFERRED EMBODIMENTS

First Embodiment

A first embodiment, in which an optical transmitting apparatus, an optical receiving apparatus, and an optical transmitting-receiving system are applied to a system which employs an optical interconnecting method, will be described in detail hereinafter with reference to the drawings.

Figure 1:
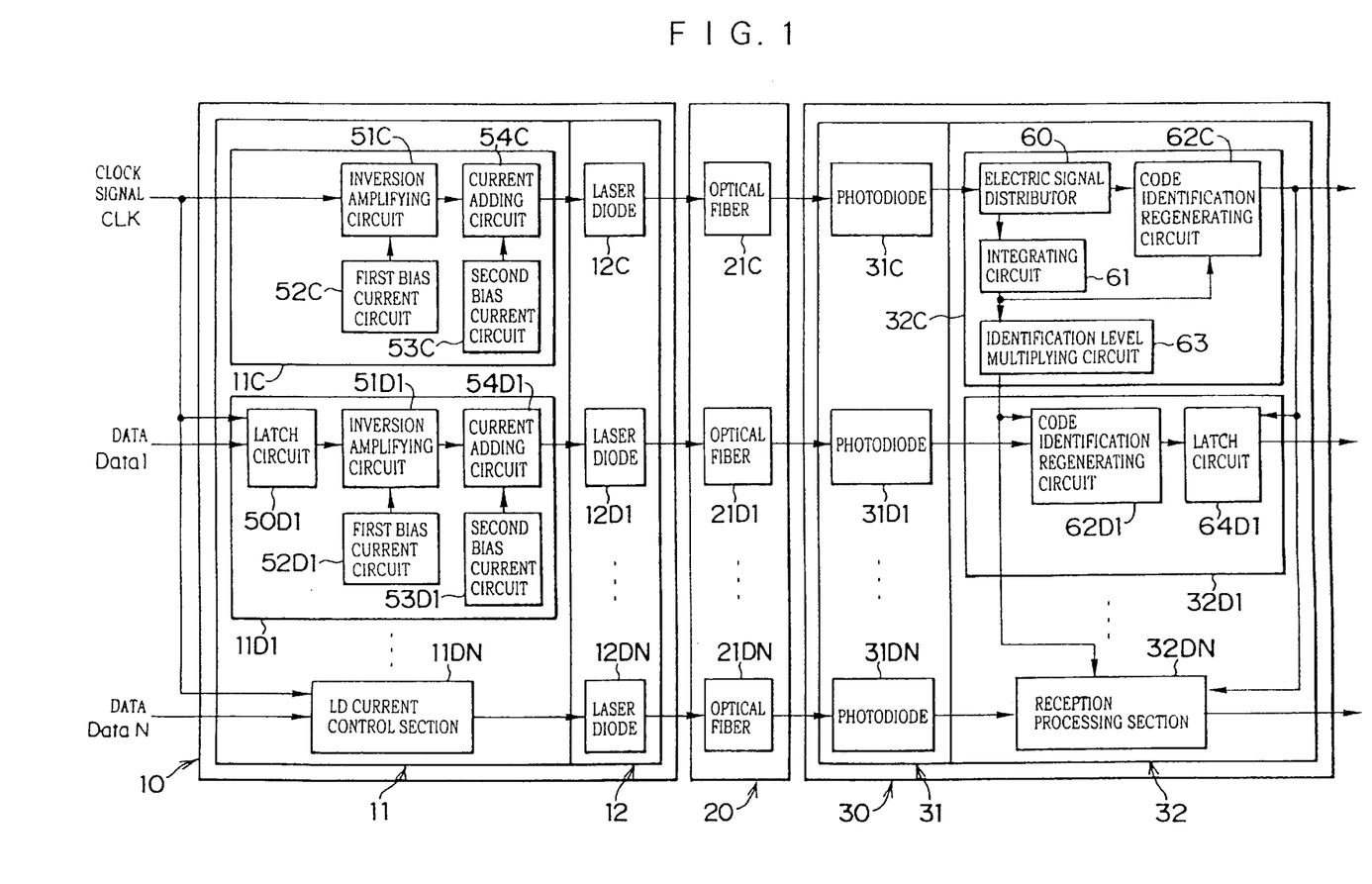
FIG. 1 is a block diagram which shows the overall structure of a first embodiment.

FIG. 1 is a block diagram which shows the schematic structure of an optical transmitting-receiving system relating to the first embodiment. In FIG. 1, the optical transmitting-receiving system relating to the first embodiment is formed by a transmitting module 10, an optical fiber array module 20, and a receiving module 30. The transmitting module 10 is formed by, for example, an electronic circuit section 11 formed by one LSI and a laser diode (LD) array section 12.

A clock signal CLK (in the first embodiment, the duty ratio is 50%) and N (N is an integer larger than or equal to 1; e.g., in case of a parallel transmission of 8 bits or 32 bits, N is equal to 8 or 32) transmission data Data1 to DataN are input to the electronic circuit section 11 of the transmitting module 10. The electronic circuit section 11 is formed by an LD (Laser Diode, hereinafter it may be referred to just as LD) current control portion 11C for a clock signal and LD current control portions 11ID1, . . . , 11DN for transmission data Data1, . . . , DataN.

The LD current control portion 11C for a clock signal is formed by an inversion amplifying circuit 51C equipped with a voltage-to-current converting function (hereinafter, "inversion amplifying circuit"), a bias current circuit 52C for determining amplitude (hereinafter, "first bias current circuit"), a laser diode minimum current circuit 53C (hereinafter, "second bias current circuit"), and a current adding circuit 54C.

The inversion amplifying circuit 51C inverts/amplifies the clock signal CLK which is formed by a voltage signal, and at the time of the inversion/amplification, the inversion amplifying circuit 51C converts the clock signal into a current signal and supplies the inverted/amplified clock signal into a current signal and supplies the inverted/amplified clock signal (current signal) to the current adding circuit 54C. The first bias current circuit 52C supplies to the inversion amplifying circuit 51C a bias current for determining the amplitude (difference in currents between the time in which logical level is high and the time in which logical level is low) of a driving current supplied to a laser diode 12C, which will be described later, so as to obtain a desirable amplitude of the amplified current (the clock signal). The reason why the inversion amplifying circuit 51C inverts/amplifies will be described later.

In case in which transmission loss is large due to a long transmission distance and the quality of transmission is adversely affected, a bias current for determining the amplitude generated by the first bias current circuit 52C may be selected so that the difference between the time in which logical level is high and the time in which logical level is low is large.

The second bias current circuit 53C outputs the minimum bias current of the driving current to the laser diode 12C, which will be described later. In the first embodiment, this bias current is set to a current larger than the largest threshold value current within the range of operating temperatures of the laser diode 12C.

Figure 3:
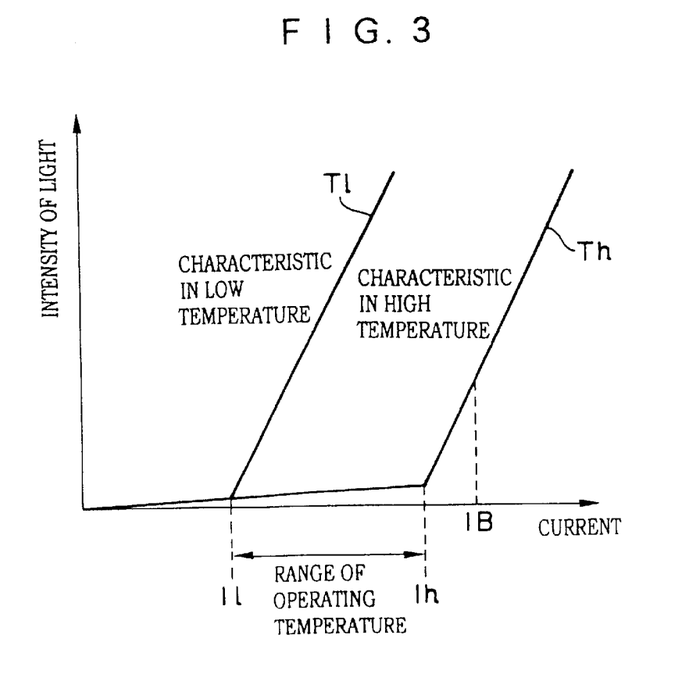
FIG. 3 is an explanatory view of a bias current for offset in the first embodiment.

FIG. 3 is an explanation auxiliary view of the above description and shows a relationship between the driving current of the laser diode 12C and an output power characteristic. The light emission of the laser diode 12C and an output power characteristic. The light emission of the laser diode 12C is started from a small driving current Il at a low temperature T1 (e.g., 0° C.), and as the driving current is increased, the intensity of the light emission is increased. On the other hand, the light emission of the laser diode 12C is started from a driving current Ih, which is larger than the above-described driving current Il, at a high temperature Th (e.g., 80° C.), and as the driving current is increased, the intensity of the light emission is increased. If the operating temperature range compensated for by the transmission system is 0° C. to 80° C., the bias current (IB) from the second bias current circuit 53C is selected as a current which is larger than the driving current (the threshold value current), from which the light emission of the laser diode 12C is started.

The current adding circuit 54C synthesizes (adds) the clock signal (the current signal) from the inversion amplifying circuit 51C and the bias current from the second bias current circuit 53C so as to supply the driving current to the corresponding laser diode 12C.

As described above, the current from the inversion amplifying circuit 51C is not directly supplied to the laser diode 12C. Instead, the above-described current and the bias current from the second bias current circuit 53C are synthesized (added) and supplied to the laser diode 12C for the following reason. In a case in which the current from the inversion amplifying circuit 51C is directly supplied to the laser diode 12C, the driving current having low logical level is substantially 0. Thus, an unfavorable influence due to the pattern effect of the laser diode, which was previously referred to as a conventional drawback, may occur. On the other hand, as described in the first embodiment, in a case in which the bias current which is larger than the largest threshold value current within the range of operating temperatures of the laser diode 12C is added, the laser diode 12C is invariably in an oscillated state, and the adverse influence due to the pattern effect of the laser diode 12C can be prevented beforehand.

In a case in which the pattern effect greatly influences the quality of the reception data in relation to the transmission distance or the quality of transmission, it is adequate if the bias current generated by the second bias current circuit 53C takes a sufficient margin from the largest threshold value current within the range of operating temperatures of the laser diode 12C.

Figure 4:
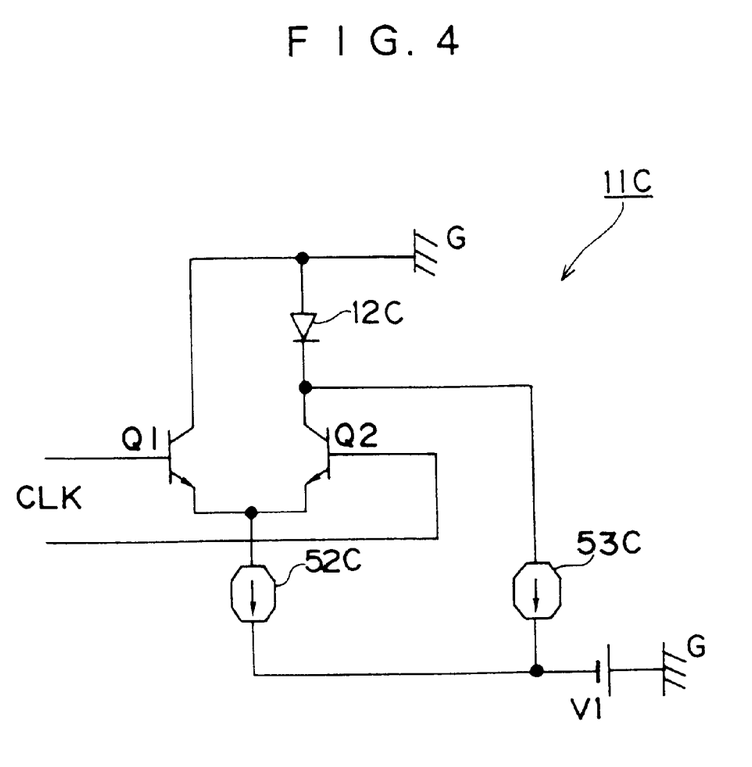
FIG. 4 is a circuit diagram which shows the detailed structure of an LD current control portion for a clock signal in the first embodiment.

FIG. 4 is a circuit diagram which shows a concrete circuit example of the LD current portion 11C for a clock signal. The LD current control portion 11C for a clock signal shown in FIG. 4 is a circuit in which a ground potential G is a high power supply voltage which centers around a differential amplifying pair of transistors Q1 and Q2. A common emitter for the differential amplifying pair of transistors Q1 and Q2 is connected to a constant current source corresponding to the first bias current circuit 52C. Further, a corresponding laser diode 12C is serially connected to the collector of the transistor Q2, and the connecting point (corresponding to the current adding circuit 54C) between the laser diode 12C and the collector of the transistor Q2 is connected to a constant current source corresponding to the second bias current circuit 53C. Moreover, the clock signal (the voltage signal) CLK is applied to the base pair of the differential amplifying pair of transistors Q1 and Q2.

Namely, in the LD current control portion 11C for a clock signal shown in FIG. 4, as the clock signal (the voltage signal) CLK is applied to the differential amplifying pair oftransistors Q1 and Q2, to which is flowed a constant current from the constant current source corresponding to the first bias current circuit 52C, a collector current whose logic is inverted from the logic of the clock signal CLK, flows to the collector of the transistor Q2. The collector current and a bias current generated by the constant current source corresponding to the second bias current circuit 53C are added via a connection and the added current thereby flows to the laser diode 12C.

On the other hand, as shown in detail in FIG. 1 regarding the transmission data, the LD current control portion 11DX (X is 1 to N) for each transmission data includes an inversion amplifying circuit 51DX, a first bias current circuit 52DX, a second bias current circuit 53DX, a current adding circuit 54DX, in the same way as the LD current control portion 11C for the clock signal. In addition, the LD current control portion 11DX includes a latch circuit 50DX. Descriptions of functions of the inversion amplifying circuit 51DX, the first bias current circuit 52DX, the second bias current circuit 53DX, and the current adding circuit 54DX are omitted.

The latch circuit 50DX latches an input transmission data DataX on the basis of the clock signal CLK and supplies the data to the inversion amplifying circuit 51DX. In this way, even if the synchronization of N transmission data (Data1 to DataN), which are transmitted module 10, are disordered, the synchronization of data is made reliable. It is significant that the inversion amplifying circuit 51DX be used in the LD current control portion 11DX for transmission data.

As mentioned above, when the logic of the input transmission data DataX is "0", the inversion amplifying circuit 51DX outputs a large driving current to the laser diode 12DX, which will be described later. In general, if processing such as scrambling or the like is not carried out, there are many "0"s in the transmission data DataX (e.g., in case of an RZ signal, there are many "0"s). In a case in which the transmission data DataX is not inverted and the laser diode 12DX is driven, the rate of "0"s in the driving pattern is increased and the unfavorable influence due to the aforementioned pattern effect of the laser diode 12DX occurs. Thus, in the first embodiment, the inversion amplifying circuit 51DX is provided, and when the rate of "0"s in the input transmission data DX is high, a large driving current flows to the laser diode 12DX such that the unfavorable influence due to the pattern effect is prevented.

In a case in which the rate of "1"s in the transmission data DataX is high, a simple voltage-to-current converting circuit may be used instead of the inversion amplifying circuit 51DX. Namely, an inversion amplifying circuit or a non-inversion amplifying circuit may be selected so as to prevent the pattern effect from occurring to the laser diode 12DX.

Also, in an electrical transmitting system, low electric power consumption is expected, so that the rate of low driving voltage is increased in a driving voltage or the like with respect to a transmitting path. However, as described in the above, in case of an optical transmission, since there is a drawback in that the quality of transmission from the phase surface deteriorates, the inversion amplifying circuit 51DX is provided.

Since the duty ratio of the clock signal CLK is 50%, the inversion amplifying circuit 51C may be omitted. However, in the case of first embodiment, as will be described later, it is preferable that the influence due to the temperature variation or the like is the same between the transmission of the clock signal CLK and that of the transmission data DataX. Consequently, the inversion amplifying circuit 51C is also provided for detecting the transmission processing of the clock signal CLK.

The concrete circuit structure of the LD current control portion 11DX (X is 1 to N) for each transmission data is unillustrated. However, a general concrete structure serving as a D-type flip-flop circuit (a latch circuit) which is added to the circuit structure shown in the aforementioned FIG. 4 will be discussed.

The laser diode array section 12 includes laser diodes 12C, 12D1, ..., 12DN corresponding to the number of clock signal CLK and transmission signals of the respective transmission data DataX. The laser diodes 12C, 12D1, ..., 12DN are closely located, e.g. on the same wafer substrate. The laser diodes 12C, 12D1, ..., 12DN carry out electrical-to-optical conversions in accordance with the driving currents from the current adding circuits 54C, 54D1, ..., 54DN, and the converted optical signals are incident on corresponding optical fibers 21C, 21D1 ..., 21DN.

The optical fiber array module 20 is formed by the optical fibers 21C, 21D1, ..., 21DN corresponding to the number of clock signal CLK and the number of transmission signals of respective transmission data DataX. The optical fibers 21C, 21D1, ..., 21DN are disposed in a row on a tape member. Alternatively, the optical fibers 21C, 21D1, ..., 21DN, which correspond to the clock signal CLK and the number of transmission signals of respective transmission data DataX, are disposed in a row in the shape of a concentric circle around a core wire. The optical fibers 21C, 21D1, ..., 21DN guide the optical signals from the corresponding laser diodes 12C, 12D1, ..., 12DN to the corresponding photodiodes 31X, 31D1, ..., 31DN, to be described later.

The receiving module 30 is formed by a photodiodes (PD) array section 31 and an electronic circuit section 32, which is formed by, e.g., an LSI. The photodiodes array section 31 includes photodiodes 31C, 31D1, ..., 31DN, which correspond to the clock signal CLK and the number of transmission signals of respective transmission data DataX. The photodiodes 31C, 31D1, ..., 31DN are closely located, e.g., on the same wafer substrate. The photodiodes array section 31 converts the optical signals from the corresponding optical fibers 21C, 21D1, ..., 21DN and outputs electric signals (including current signals or voltage signals converted therefrom).

The electronic circuit section 32 is formed by a reception processing portion 32C for a clock signal and reception processing portions 32D1, ..., 32DN for respective transmission (received) data.

The reception processing portion 32C for the clock signal includes an electric signal distributor 60, an integrating circuit 61, a code identification regenerating circuit 62C, and an identification level multiplying circuit 63.

The electric signal distributor 60 divides an electric signal from the photodiode 31C in two and distributes one of the branch signals to the integrating circuit 61 and the other of the branch signals to the code identification regenerating circuit 62C. The levels of respective branch signals are half the level of the signal before its branched.

The integrating circuit 61 includes a sufficiently large time constant so as to integrate and convert the input branch signal into a signal having a DC level. Because the branch signal input to the integrating circuit 61 has a clock signal component having the duty ratio of 50%, the converted DC level is the center level of amplitudes of the input branch signal. The DC level is supplied to the code identification regenerating circuit 62C as an identification level for determining a code. Namely, in the first embodiment, since the identification level is formed by the received signal (the clock signal), the identification level varies in accordance with the level variations or the like of the received signal.

The code identification regenerating circuit 62C compares the level of the branch signal from the electric signal distributor 60 to that of the identification level from the integrating circuit 61 so as to regenerate a transmitted clock signal (determine a code). In the regeneration processing, a high level and a low level in the input signal are inverted so as to regenerate a clock signal. This corresponds to the fact that the inversion amplifying circuit 51C is provided at the transmitter side.

The identification level multiplying circuit (DC amplifying circuit) 63 multiplies the level of the identification level from the integrating circuit 61 by a predetermined amount and supplied the multiplied level to the reception processing portions 32D1, . . . , 32DN for all the transmission (received) data as the identification level for the circuit.

At the transmitter side, in a case in which the bias currents in all of the first bias current circuits 52C, 52D1, . . . , 52DN are equal and the bias currents in all of the second bias currents circuits 53C, 53D1, . . . , 53DN are equal, the amount of multiplication is two. Because the level of the received signal relating to the clock signal is halved by the branching processing of the electric signal distributor 60, the identification level from the integrating circuit 61 cannot be used as it is by the reception processing portions 32D1, . . . , 32DN for the transmission (received) data. The identification level multiplying circuit 63 is thereby provided.

In a case in which the bias current in the first bias current circuit 52C for the clock signal is different from the bias currents in the first bias current circuits 52D1, . . . , 52DN and/or in a case in which the bias current in the second bias current circuit 53C for the clock signal is different from the bias currents in the second bias current circuits 53D1, . . . , 53DN for transmission data, the amount of multiplication at the identification level multiplying circuit 63 may be selected in accordance with the difference in the bias currents.

Figure 5:
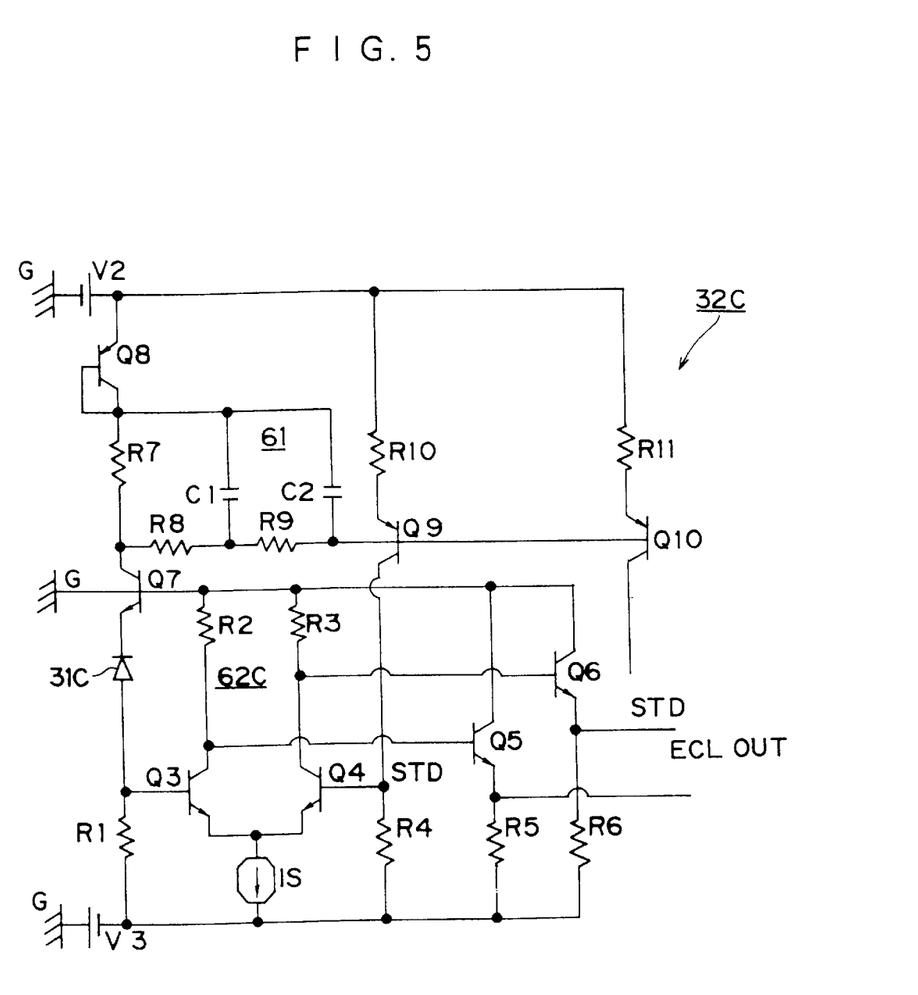
FIG. 5 is a circuit diagram which shows the detailed structure of a reception processing portion for a clock signal in the first embodiment.

FIG. 5 is a circuit diagram which shows the concrete circuit example of the reception processing portion 32C for a clock signal. As shown in FIG. 5, the reception processing portion 32C for a clock signal operates with a positive power supply V2, a negative power supply V3, and a ground potential G serving as power supply voltages.

In FIG. 5, a differential amplifying circuit portion which is formed by a pair of NPN transistors Q3, Q4 is a circuit portion which directly determines a code. The NPN transistor Q3 includes a load resistor R2 and the NPN transistor Q4 includes a load resistor R3, and the emitters of the NPN transistors Q3, Q4 are connected in common to a constant current source IS. The differential amplifying circuit portion formed by the pair of NPN transistors Q3, Q4 operates with the difference between the ground potential G and the negative power supply voltage V3 serving as a power supply voltage.

The emitter and the collector of a PNP transistor Q8 whose base and collector are connected to the high voltage side of the integrating circuit 61, a resistor R7, the emitter and the collector of an NPN transistor Q7 whose base is set to the ground potential G, a photodiode 31C, and a resistor R1 are connected serially between the positive power supply voltage V2 and the negative power supply voltage V3. The connecting point between the anode of the photodiode 31C and the resistor R1 is connected to the base of the transistor Q3. In accordance with the intensity of received light, the current flowing through the photodiode 31C is converted into a voltage by the resistor R1 and the converted voltage is applied to the base of the transistor Q3.

Further, a resistor R10, the emitter and the collector of a PNP transistor Q9 whose base is connected to the low voltage side of the integrating circuit 61, and a resistor R4 are connected serially between the positive power supply voltage V2 and the negative power supply voltage V3. The connecting point between the collector of the transistor Q9 and the resistor R4 is connected to the base of the transistor Q4. In accordance with the charge voltage of the integrating circuit 61, the current (although variable, a constant current in a short period) flowing through the serial circuit is converted into a voltage by the resistor R4, and the converted voltage is applied to the base of the transistor Q4.

When the intensity of light to the photodiode 31C is high and a large current flows to the photodiode 31C, the voltage applied to the base of the transistor Q3 is larger than the voltage applied to the base of the transistor Q4, and the collector voltage of the transistor Q3 is smaller than the collector voltage of the transistor Q4. On the other hand, when the intensity of light to the photodiode 31C is low and a small current flows to the photodiode 31C, the voltage applied to the base of the transistor Q3 is smaller than the voltage applied to the base of the transistor Q4, and the collector voltage of the transistor Q3 is larger than the collector voltage of the transistor Q4.

Between the ground potential G and the negative power supply voltage V3, an output circuit is structured by a serial circuit (emitter-follower circuit) formed by an NPN transistor Q5 whose base is connected to the collector of the transistor Q3 and a resistor R5 and a serial circuit formed by an NPN transistor Q6 whose base is connected to the collector of the transistor Q4 and a resistor R6. A voltage difference between the collector voltages of the transistors Q3 and Q4 is output without being inverted and amplified.

The circuit portion, in which a resistor R8, a capacitor C1, a resistor R9, and a capacitor C2 are connected in a ladder shape, forms the integrating circuit 61. One end of the resistor R8 is connected to the connecting point (corresponding to the electric signal distributor 60) between the aforementioned resistor R7 and the collector of the transistor Q7. Further, the common connecting point between the capacitors C1 and C2 are connected to the connecting point between the resistor R7 and the collector (and the base) of the transistor Q8. Consequently, in accordance with the voltage generated between the ends of the resistor R7 based on the current supplied to the photodiode 31C, the integrating circuit 61 is charged or discharged. The time constant of the integrating circuit 61 determined by the capacities of the capacitors C1 and C2 is large and the charge voltage of the integrating circuit 61 is stable for the most part.

The charge voltage of the integrating circuit 61 is applied to the base of the aforementioned transistor Q9, and the transistor Q9 and the resistor R10 form a current source. A current generated by the current source is converted into a voltage by the resistor R4, and as mentioned above, the converted voltage is applied to the base of the transistor Q4 as a reference voltage for determining a code.

A resistor R11 and a PNP transistor Q10, which are serially connected at the positive power supply voltage V2 side, form a current source circuit and correspond to the level multiplying circuit 63. The charge voltage of the integrating circuit 61 is applied to the base of the transistor Q10. Due to the relationship between the resistance value (r) of the resistor R11 and the resistance value (2r) of the resistor R10, a current which is twice as large as that of the transistor Q9 flows to the transistor Q10.

Although unillustrated, the collector of the transistor Q10 is connected to the circuit portion, which corresponds to the transistor Q4 and the resistor R4, of a reception processing portion 32DX for any of the transmission (received) data, to be described later. FIG. 5 shows only one serial circuit of the resistor R11 and the transistor Q10. However, serial circuits which correspond to the number of reception processing portions 32D1 to 32DN for transmission (received) data may be provided.

The reception processing portion 32DX (X is 1 to N) for each transmission (received) data includes a code identification regenerating circuit 62DX and a latch circuit 64DX.

The code identification regenerating circuit 62DX compares the level of the electric signal from the corresponding photodiode 32DX to the identification level from the level multiplying circuit 63 so as to regenerate a transmitted transmission data DataX (determine a code). In this regeneration processing as well, the high level and the low level of the input signal are inverted so as to regenerate a transmission DataX.

The latch circuit 64DX delivers the regenerated transmission data DataX to a device in the next stage on the basis of the regenerated clock signal CLK.

FIGS. 6A through 6E and FIGS. 7A through 7E are timing charts of respective portions in an optical transmitting-receiving system of the first embodiment.

Figure 6A:
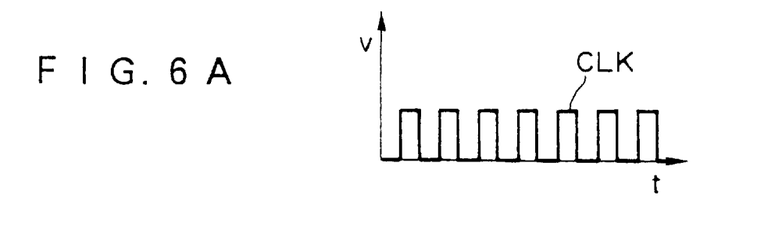
FIGS. 6A to 6E are timing charts (1) of each portion of the first embodiment.
Figure 6B:
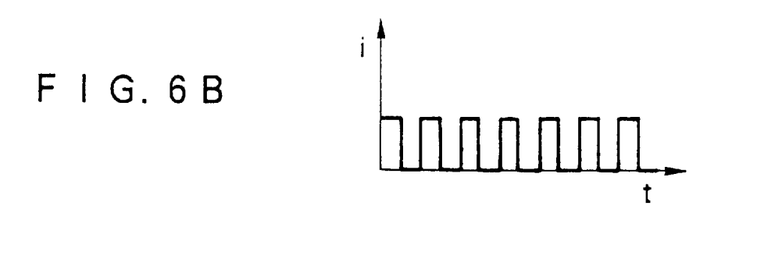
Figure 6C:
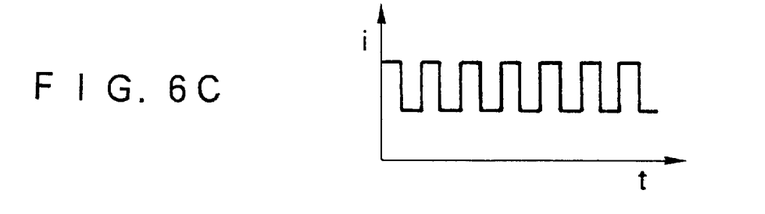

At the transmitter side, the input clock signal (the voltage signal) CLK shown in FIG. 6A is inverted/amplified and makes a voltage-to-current conversion at the inversion amplifying circuit 51C. As shown in FIG. 6B, the input clock signal CLK is converted into a signal which has an amplitude determined by the bias current from the first bias current circuit 52C and whose logical level is inverted. The signal is then supplied to the current adding circuit 54C. At the current adding circuit 54C, a bias current from the second bias current circuit 53C is added to the signal. The added signal is converted into a driving signal having a DC offset shown in FIG. 6C. The driving signal is supplied to the laser diode 12C so as to make an electrical-to-optical conversion and is incident on the optical fiber 21C.

Figure 7A:
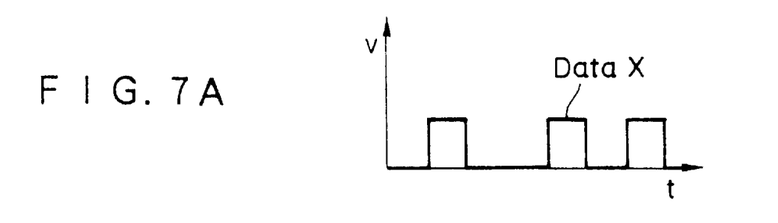
FIGS. 7A to 7E are timing charts (2) of each portion in the first embodiment.
Figure 7B:
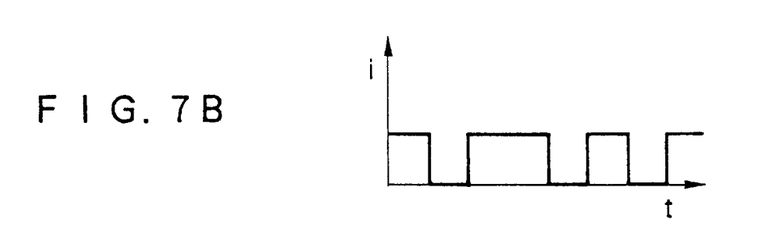
Figure 7C:
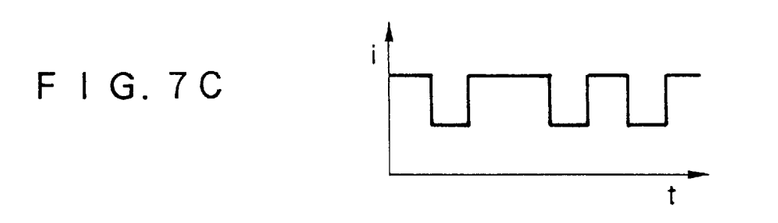

Further, at the transmitter side, the input transmission data (the voltage signal) Data1 is latched at the latch circuit 50D1 on the basis of the clock signal CLK. Data1 is converted into a data synchronized with the clock signal shown in FIG. 7A, and thereafter, the data is inverted/amplified and makes a voltage-to-current conversion at the inversion/amplifying circuit 51D1. As shown in FIG. 7B, the input transmission data Data1 is converted into a signal which has an amplitude determined by the bias current from the first bias current circuit 52D1 and whose logical level is inverted. The converted signal is then supplied to the current adding circuit 54D1. At the current adding circuit 54D1, the bias current from the second bias current circuit 53D1 is added to the signal. The added signal is converted into a driving signal having a DC offset shown in FIG. 7C. The driving signal is supplied to the laser diode 12D1 so as to make an electrical-to-optical conversion and is incident on the optical fiber 21D1.

The same processing is effected on the other transmission data Data2 to DataN, and the signals are incident on the optical fibers 21D2 to 21DN from the laser diodes 12D2 to 12DN.

Figure 6D:
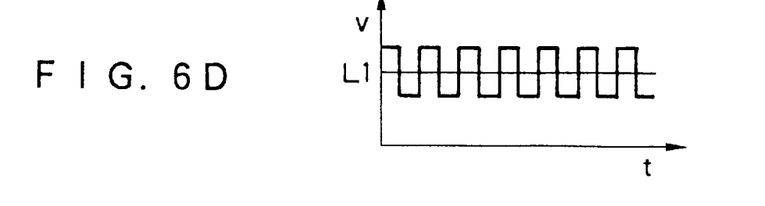
Figure 6E:
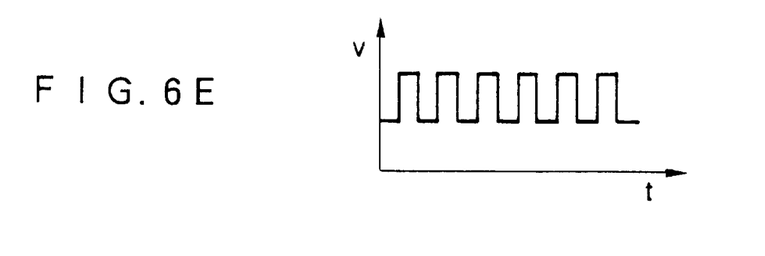

On the other hand, at the receiver side, the received signal which makes an optical-to-electrical conversion by the photodiode 31C for the clock signal is divided in two at the electric signal distributor 60. The branched signal shown in FIG. 6D is supplied to the integrating circuit 61 and the code identification regenerating circuit 62C. In FIG. 6D, the branched signal is illustrated in the shape of square waves, however, an actual branched signal is more sinusoidal than the illustrated signal. At the integrating circuit 61, as the branched signal is integrated, the identification level L1 shown in FIG. 6D is formed so as to be supplied to the code identification regenerating circuit 62C. The code identification regenerating circuit 62C compares the identification level to that of the branched signal (including inversion processing) so as to regenerate the transmitted clock signal shown in FIG. 6E.

Figure 7D:
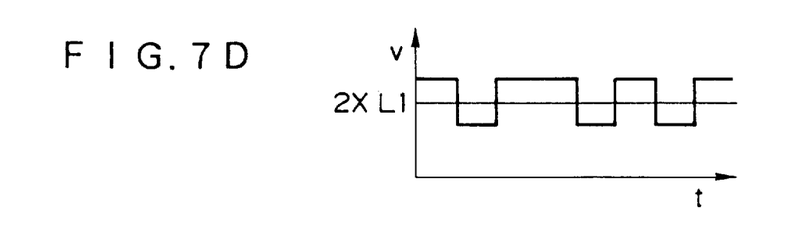

The identification level from the integrating circuit 61 is multiplied by a predetermined amount (e.g., 2) by the identification level multiplying circuit 63, converted into an identification level (e.g., 2×L1) for the regeneration of transmission data shown in FIG. 7D, and supplied to the reception processing portions 32D1 to 32DN for all of the transmission (received) data.

Figure 7E:
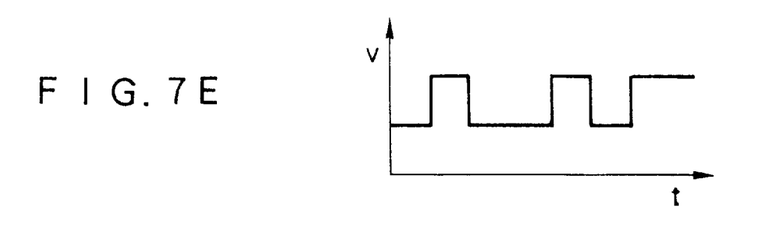

The received signal, which makes an optical-to-electrical conversion by the photodiode 31D1 for transmission data and shown in FIG. 7D, is supplied to the code identification regenerating circuit 62D1. In FIG. 7D, the received signal is illustrated in the shape of square waves, however, the actual received signal is more sinusoidal than the illustrated signal. The code identification regenerating circuit 62D1 compares the size of the identification level from the identification level multiplying circuit 63 to that of the received signal (including inversion processing). As shown in FIG. 7E, the transmission data Data1 is regenerated. The regenerated transmission data1 is latched at the latch circuit 64D1 on the basis of the regenerated clock signal CLK and is delivered to a device in the next stage.

In accordance with the optical transmitting apparatus, the optical receiving apparatus, and the optical transmitting-receiving system in the aforementioned first embodiment, the following effects can be achieved.

(1) Because the information about the identification level (the clock signal) is transmitted in addition to the data, even if the received signal level is changed due to temperature variations at the time of transmitting of the transmission data, the identification level changes in the same way as the changes of the received signal level. Accordingly, the phase of each regenerated transmission data becomes stable (reduction of jittering), and the phases of the plurality of regenerated transmission data can be made more uniform (in other words, the amount of skew can be decreased).

The identification level of the clock signal is formed by the clock signal. Since the rate of variation due to the temperature characteristic or the like is the same, the center level of amplitude of the clock signal invariably becomes the identification level.

Further, since the plurality of laser diodes which are closely arranged (e.g., formed within several hundred microns) on the same wafer substrate formed by a uniform process have substantially the same characteristics and are connected to the optical fiber array section, the laser diodes have substantially the same temperature characteristics.

Moreover, in a case in which the driving circuit portions of the laser diodes are also formed with LSI, the bias currents in the laser diodes are substantially the same (e.g., a current mirror circuit or the like is used). Still further, in a case in which a plurality of photodiodes are also closely formed on the same wafer substrate, the photodiodes have substantially the same characteristics.

Therefore, the rate of level changes in the temperature of each transmitting path is substantially the same. If the optical connection is substantially constant, the identification level for transmission data, which is formed by multiplying the identification level for a clock signal by a predetermined amount (2), can be made substantially constant (e.g., the center level of amplitudes of the transmission data) with respect to variations of temperature or the like of the transmission data. Accordingly, the aforementioned effects can be achieved.

(2) Since the identification level is varied and not fixed, the identification level can be set large. As a result, the driving current, which invariably oscillates, can be supplied to the laser diode (due to the bias current from the second bias current circuit), and the unfavorable influence due to the pattern effect of the laser diode can be reduced as compared to the conventional art.

(3) Since the variant identification level is formed by integrating the clock signal, it is not necessary to provide transmitting paths (including both the optical fiber and the peripheral circuits thereof) for exclusively transmitting the variant identification level. The hardware structure for optical transmission can be made similar to that of the conventional art.

(4) It is arranged such that a large current flows to the laser diode when the data to be transmitted is of the logical level of the higher appearance rate. Thus, as compared to the conventional art, the rate in which the large current flows to the laser diode increases, and the unfavorable influence due to the pattern effect can be reduced.

(5) Since the circuit is resistant to temperature variations, there is no need to have a temperature setting circuit at the transmitter side or the receiver side. Namely, hardware such as a Peltier element or a control circuit thereof and the electric power consumed by the hardware can be remarkably reduced. Further, since the identification level varies, there is no need to have an output setting circuit. As a result, the electric power consumption and the hardware can be reduced Second Embodiment A second embodiment in which an optical transmitting apparatus, an optical receiving apparatus, and an optical transmitting-receiving system are applied to a system which employs an optical interconnecting method will be described in detail with reference to the drawings.

Figure 8:
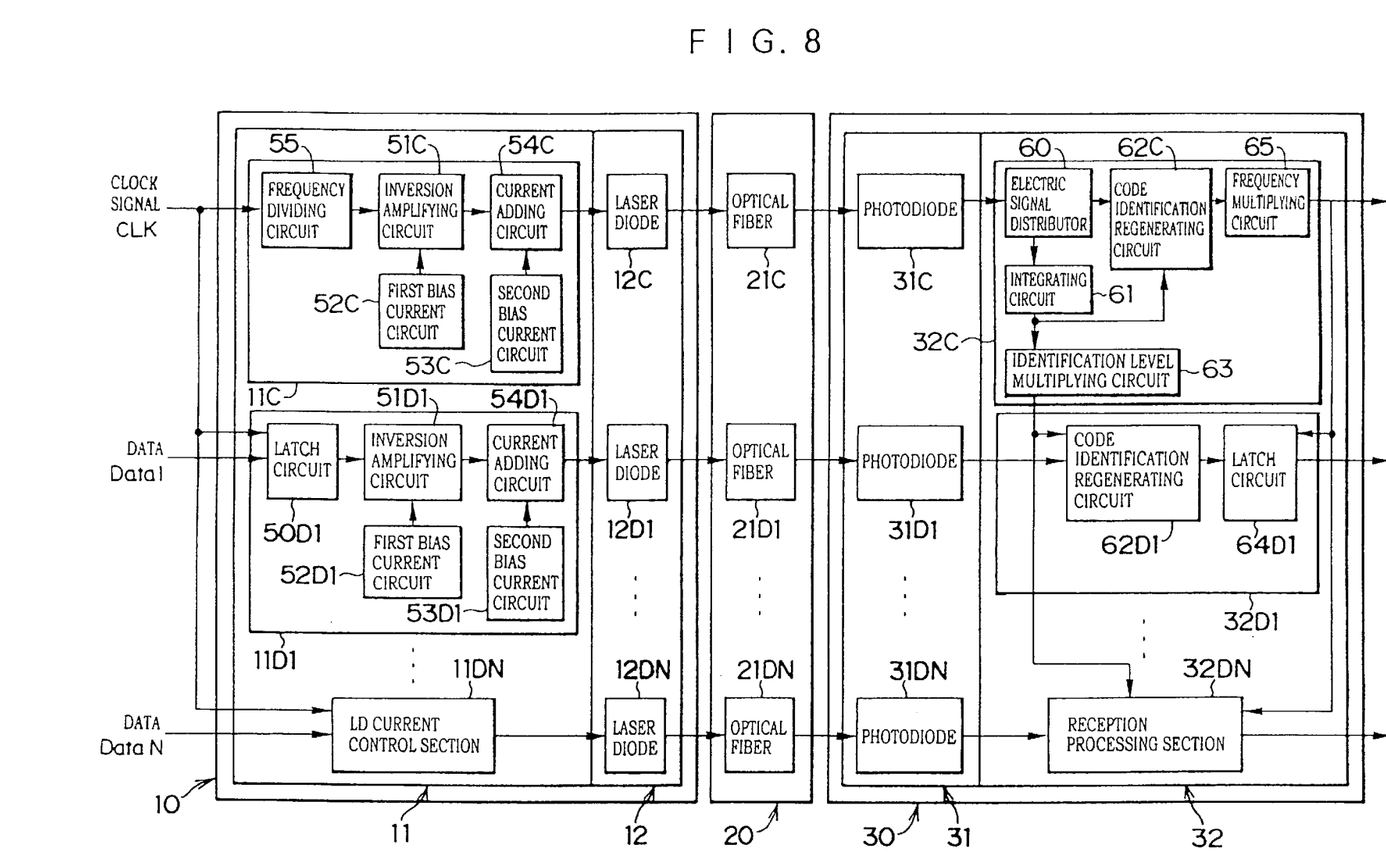
FIG. 8 is a block diagram which shows the overall structure of a second embodiment.

FIG. 8 is a block diagram which shows the schematic structure of an optical transmitting-receiving system of the second embodiment. The portions which are the same as and which correspond to those in FIG. 1 relating to the aforementioned first embodiment are denoted by the same reference numerals.

As is clearly seen from the comparison between FIG. 8 and FIG. 1, in the second embodiment, in addition to the structure of the first embodiment, a frequency dividing circuit 55 is provided within an LD current control portion 11C for a clock signal, and a frequency multiplying circuit 65 is provided within a reception processing portion 32C for a clock signal.

The frequency dividing circuit 55 divides the frequency of an input clock signal CLK in two and supplies the divided frequency to an inversion amplifying circuit 51C. The frequency multiplying circuit 65 multiplies the frequency of the signal from a code identification regenerating circuit 62C by two so that the clock signal is regenerated. The functions of the other structural elements are the same as those of the first embodiment, and descriptions thereof are omitted.

The basic frequency component of the clock signal CLK is higher than the basic frequency component of the transmission data DataX (see FIGS. 6 and 7). Due to the frequency characteristics of the optical fiber, the difference in these frequency components may slightly change the degree of level changes between the received signal relating to the clock signal and the received signal relating to the transmission data. Accordingly, the frequency dividing circuit 55 and the frequency multiplying circuit 65 are provided in the second embodiment, such that the frequency components of optical signals transmitted within all of the optical fibers are made as uniform as possible.

The effects of the second embodiment are similar to those of the aforementioned first embodiment. Additionally, since the frequency components of optical signals can be made as uniform as possible, the transmission precision at a phase surface can be further improved.

Third Embodiment

Next, a third embodiment, in which an optical transmitting apparatus, an optical receiving apparatus, and an optical transmitting-receiving system are applied to a system which employs an optical interconnecting method, will be described identical with reference to the drawings.

Figure 9:
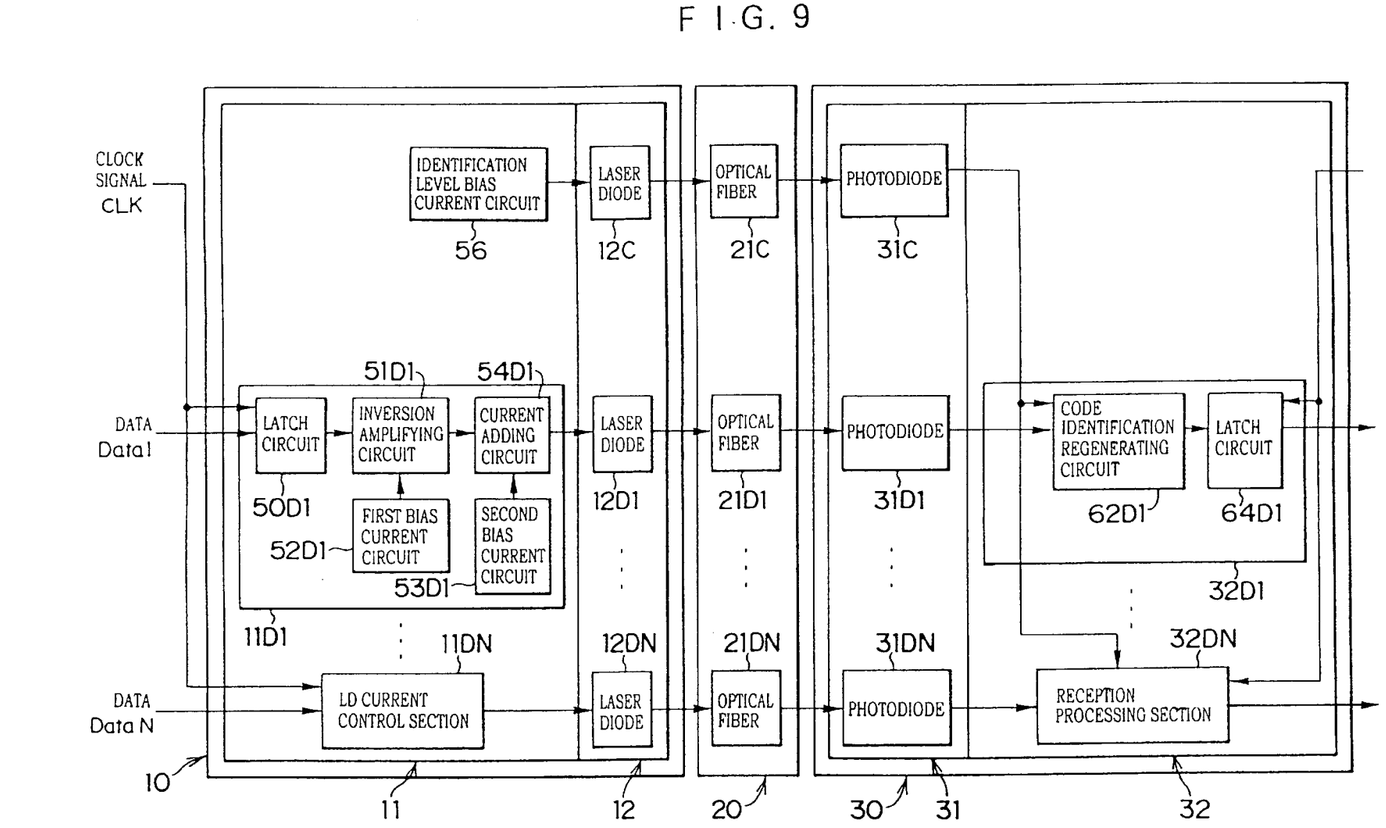
FIG. 9 is a block diagram which shows the overall structure of a third embodiment.

FIG. 9 is a block diagram which shows the schematic structure of the optical transmitting-receiving system relating to the third embodiment. The portions which are the same as or correspond to those in FIG. 1 relating to the aforementioned first embodiment are denoted by the same reference numerals.

In the third embodiment, an identification level bias current circuit 56 is provided. The identification level bias current circuit 56 supplies a bias current (a driving current), which corresponds to the identification level used for determining the code of a transmission data at the receiver side, and to a laser diode 12C so as to emit a light. The optical signal makes an optical-to-electrical conversion into an electric signal (an identification level) by a photodiode 31C, and the electric signal is supplied to reception processing portions 32D1 to 32DN for all of the transmission data. Namely, the identification level is transmitted directly and not transmitted by using a clock signal.

Even in the third embodiment, since the information about the identification level is transmitted from the transmitter side to the receiver side, the identification level also varies in accordance with the temperature variations or the like. The third embodiment can achieve the same effect, which is caused by using a variable identification level and which was referred to the description of the effect in the first embodiment, as it is.

The influence due to temperature variations or the like in the electric circuit portion is different between in the transmitting route of the identification level and in that of the transmission data. However, the influence due to the temperature variations or the like is much larger in the optical signal processing system than in the electric signal processing system. The effect referred to in the description of the effect in the first embodiment can be achieved in this manner.

As is clearly seen from the comparison between FIG. 9 and FIG. 1, the structure of the third embodiment is very simple. It is preferable if the third embodiment is applied to a transmitting-receiving system including a circuit which generates a clock component from a received data. Although not shown in FIG. 9, the clock signal may also be transmitted regardless of the transmission of the identification level information. In case of the third embodiment, the photo-diode 31C serves as identification level supplying means.

Other Embodiments

In the above embodiments, the identification level information is transmitted by one route. However, the identification level may be transmitted by a plurality of routes. For example, if transmission data includes 32 bits, the identification level information may be transmitted by a sum of four routes, one per eight bits. In this case, a set of laser diodes for the identification level information and a set of optical fibers corresponding to this set of laser diodes may be provided in the midway among the sets of laser diodes for 8-bit transmission data and optical fibers corresponding to each of the laser diodes.

Further, in the above embodiments, the present invention is applied to a case in which the transmission data is conveyed in parallel. However, the present invention is applicable even to a case in which there is only one transmission data. In this case as well, the effect of reducing the jittering of regenerated data is expected. Namely, the present invention is carried out in consideration of an optical transmitting-receiving system in accordance with an optical interconnecting method. However, it goes without saying that the present invention is applicable to other optical transmitting-receiving systems.

Moreover, in the above embodiments, there exists a technical idea in which the logical level of the transmission data is adjusted such that the emission of light increases at the side in which the optical intensity of laser diode is high, a technical idea in which a current which is larger than the threshold value current invariably flows to a laser diode within the range of operating temperatures, and a technical idea in which an identification level is transmitted from the an optical transmitting apparatus to an optical transmitting-receiving system. It goes without saying that these ideas may be applied independently to the optical transmitting-receiving system.

Furthermore, in the above embodiments, because the logical level of the transmission data is adjusted so that the emission of light increases at the side in which the optical intensity of the laser diode is high, the logical level thereof is fixedly inverted. However, the inversion or non-inversion of the logical level may be selected by inputting rate information from outside as to which logical level appears more frequently. For example, this can be achieved by: an inverter circuit which inverts transmission data; a switch which selects transmission data which passes through the inverter circuit in accordance with the rate information; and a circuit which performs a voltage-to-current conversion of the switch output. The last example requires that a transmitting system which transmits the rate information to the optical receiving apparatus be provided and the inversion and non-inversion of the logical level can be selected at the optical receiving apparatus.

Still further, in the above embodiments, the bias currents are the same at the transmitting route of the clock signal and at the transmitting route of the transmission data. However, the bias currents may be different.

In accordance with the optical transmitting apparatus of the first aspect, the optical receiving apparatus of the second aspect, and the optical transmitting-receiving system of the third aspect, the identification level information is transmitted between the optical transmitting apparatus and the optical receiving apparatus. The identification level at the receiver side includes variations due to the temperature or the like similar to those of the transmitted data, such that the transmission data can be regenerated properly from the phase surface thereof.

Further, in accordance with the optical transmitting apparatus of the fourth aspect, the optical receiving apparatus of the fifth aspect, and the optical transmitting-receiving system of the sixth aspect, it is arranged such that the transmission data is transmitted in such a mode that the logical level of the transmission data whose rate of appearance is high is the side in which the optical intensity of the optical signal from the light emitter is high. Consequently, the rate in which the light emitter of the optical transmitting apparatus emits light at a strong optical intensity is increased, the average response in optical emission of the light emitter is improved, and the unfavorable effect (pattern effect) on the phase surface or the like, due to the delay in response of the light emitter, can be reduced.

Moreover, in accordance with the optical transmitting apparatus of the seventh aspect, even if the logical level of the transmission data is low, the light emitter applies a bias to the transmission data and emits light so that the logical level is larger than the lowest level of emission within the range of operating temperatures of the optical transmitting apparatus. Therefore, the unfavorable effect (pattern effect) on the phase surface or the like, due to the delay in response of the light emitter, can be reduced.

What is claimed is:

1. An optical transmitting apparatus for use with a plurality of light transmitting paths, the optical transmitting apparatus comprising:

one or more transmission data light emitters operable to convert transmission data formed by at least one signal to an optical data signal and to emit the optical data signal to a respective one of the light transmitting paths;

an identification level output circuit operable to output identification level information indicative of levels of the optical data signal that correspond to logical levels of the transmission data; and an identification level light emitter operable to convert the identification level information to an identification level optical signal and to emit the identification level optical signal to another of the light transmitting paths; and a bias circuit operable to apply a bias current to the transmission data such that all logical levels of the transmission data are greater than a lowest level at which said one or more transmission data light emitters can emit light within a range of operating temperatures of the optical transmitting apparatus.

2. An optical transmitting apparatus according to claim 1, wherein said identification level output circuit is operable to output a clock signal as the identification level information which defines a phase of the transmission data.

3. An optical transmitting apparatus according to claim 1, wherein said identification level output circuit comprises a frequency dividing circuit to divide a frequency of the clock signal.

4. An optical transmitting apparatus for use with one or more light transmitting paths, the optical transmitting apparatus comprising:

one or more transmission data light emitters operable to convert transmission data formed of at least one signal to an optical data signal and to emit the optical data signal to a respective one of the light transmitting paths; and a logic level adjusting circuit operable to adjust logical levels of the transmission data such that a logical level with a high rate of appearance in the transmission data is represented by a high intensity light signal from said one or more transmission data light emitters.

5. An optical transmitting and receiving system for use with a plurality of light transmitting paths, the optical transmitting and receiving system comprising:

an optical transmitting apparatus, comprising:

one or more transmission data light emitters operable to convert transmission data formed by at least one signal to an optical data signal and to emit the optical data signal to a respective one of the light transmitting paths;

an identification level output circuit operable to output identification level information indicative of levels of the optical data signal that correspond to logical levels of the transmission data; and an identification level light emitter operable to convert the identification level information to an identification level optical signal and to emit the identification level optical signal to another of the light transmitting paths; and a bias circuit operable to apply a bias current to the transmission data such that all logical levels of the transmission data are greater than a lowest level at which said one or more transmission data light emitters can emit light within a range of operating temperatures of the optical transmitting apparatus; and an optical receiving apparatus, comprising:

one or more transmission data light sensors corresponding to said one or more transmission data light emitters, said one or more transmission data light sensors operable to receive the optical data signal from the respective one of the light transmitting paths and to convert the optical data signal back to the transmission data, an identification level light sensor corresponding to said identification level light emitter, said identification level light sensor operable to receive the identification level optical signal from another of the light transmitting paths and to convert the identification level optical signal back to the identification level information, an identification level supplying circuit operable to output an identification level based on the identification level information provided by said identification level light sensor, and a code identification regeneration circuit operable to compare the identification level provided by said identification level supplying circuit with a logical level of the transmission data and to determine and regenerate the logical level of the transmission data.

6. An optical transmitting and receiving system according to claim 5, wherein said identification level output circuit is operable to output a clock signal which defines a phase of the transmission data as the identification level information.

7. An optical transmitting and receiving system according to claim 6, wherein said identification level output circuit comprises a frequency dividing circuit to divide a frequency of the clock signal.

8. An optical transmitting and receiving system according to claim 5, wherein said identification level supplying circuit is operable to convert the identification level information into a direct current and outputs the direct current as the identification level.

9. An optical transmitting and receiving system according to claim 8, wherein said identification level supplying circuit comprises a frequency multiplying circuit to multiply a frequency of the identification level information.

10. An optical transmitting and receiving system according to claim 5, wherein said optical transmitting apparatus further comprises an inversion amplifying circuit operable to adjust logical levels of the transmission data such that a logical level with a high rate of appearance in the transmission data is represented by a high intensity light signal being output from said one or more transmission data light emitters, and wherein said code identification regeneration circuit is operable to reverse the adjustments of the logical levels of the transmission data performed by said inversion amplifying circuit.

11. An optical transmitting and receiving system for use with one or more light transmitting paths, the optical transmitting and receiving system comprising:

an optical transmitting apparatus, comprising:

one or more transmission data light emitters operable to convert transmission data formed by at least one signal to an optical data signal and to emit the optical data signal to a respective one of the one or more light transmission paths, and an inversion amplifying circuit operable to adjust logical levels of the transmission data such that a logical level with a high rate of appearance in the transmission data is represented by a high intensity light signal being output from said one or more transmission data light emitters; and an optical receiving apparatus, comprising:

one or more transmission data light sensors corresponding to said one or more transmission data light emitters, said one or more transmission data light sensors operable to receive the optical data signal from the respective one of the one or more light transmitting paths and to convert the optical data signal back to the transmission data, and a code identification regeneration circuit operable to reverse the adjustments of the logical levels of the transmission data performed by said inversion amplifying circuit.

12. An optical transmitting and receiving system according to claim 11, wherein said optical transmitting apparatus further comprises a bias circuit operable to apply a bias current to the transmission data, such that all logical levels of the transmission data are greater than a lowest level at which said one or more transmission data light emitters can emit light within a range of operating temperatures of the optical transmitting apparatus.

* * * * *